United States Patent Office 3,531,673
Patented Sept. 29, 1970

3,531,673
TWO-PIECE ARC ELECTRODE HAVING A PLURALITY OF HEAT-CONDUCTING PATHS BETWEEN THE ARC TIP AND THE TIP HOLDER
Raymond E. Paquette, Saratoga, Calif., assignor, by mesne assignments, to Varo, Inc., Garland, Tex., a corporation of Texas
Filed June 4, 1968, Ser. No. 734,269
Int. Cl. H01j 1/42, 17/10
U.S. Cl. 313—32    11 Claims

ABSTRACT OF THE DISCLOSURE

An arc electrode with a reduced diameter tungsten electrode tip welded to the end face of a water cooled molybdenum electrode tip holder. The arc electrode also has an annular ring member which has one of its end portions welded to the hot end of the electrode tip and its other end portions welded to the end face of the electrode tip holder for providing an additional heat path to improve the flow of thermal energy from the tip to the cooled tip holder.

BACKGROUND OF THE INVENTION

This invention relates to the electrode construction for arc lamps, and, more particularly, to the construction of a fluid cooled, arc lamp anode capable of dissipating very large amounts of thermal energy.

One of the output power limitations of arc lamps is the ability of the electrode, and particularly the anode, to withstand the heat collected by its arc end without melting. It is well-known that the cathode is an emitter and the anode is a collector of electrons which accounts for the fact that the anode runs considerably hotter than the cathode, and that therefore the anode rather than the cathode is one of the output power limiting factors.

To overcome this limitation and to increase the output power of arc lamps, the prior art has concentrated primarily on either finding higher melting point materials out of which anodes can be constructed, or cooling the anode by a suitable coolant by hollowing out the interior, or both.

A highly suitable refractory metal for an electrode is tungsten which has a melting point of about 3500° C. For high output power arc lamps, hollowed out tungsten anodes having their interior cooled by a suitable coolant have found some application in the prior art. However, for very high output power lamp, the required high temperature gradient between the tip and the coolant has been found to crack the tungsten causing a lack of the low pressure integrity of the lamp. Further, even in those cases where a temperature gradient could be maintained which would not affect the vacuum tightness of the system, the expense of the material itself and the difficulty of working this hard material have made fluid coolable tungsten electrodes very expensive to produce and they have therefore only found limited use.

To overcome the high cost and material weakness of one-piece, fluid coolable tungsten anodes, the prior art has developed a two-piece fluid coolable anode in which the main body (tip holder) of the anode was made of a refractory metal less subject to heat shock and more easily machined, such as molybdenum, and in which the arc end was formed by a tungsten tip which was welded by a peripheral weld seam to the end face of the main body. The main body is readily machined to have a hollow interior into which coolant is continually pumped, and the tip is cooled by heat conduction from the arc end through the body of the tip to the tip holder and from the tip holder to the coolant. Since the arc tip is not required to maintain low pressure integrity across it, cracking of the tip no longer presents a problem. The term two-piece is used herein to designate an anode which has a tungsten arc end separate from the anode body.

The two-piece, fluid coolable anode has a smaller temperature gradient and is considerably more economical to produce than the one-piece anode, but the flow of thermal energy across the interface between the tip and the tip holder is not very efficient so that the tip temperature is rather high. In fact, the interface forms a thermal impedance which severely limits the rate at which the anode tip can be cooled and therefore the output power from the arc lamp since the temperature of the tip must be maintained below the tungsten melting point.

OBJECTS OF THE INVENTION

It is therefore a primary object of the invention to provide an arc electrode construction which is more economical and which dissipates heat more rapidly from the tip than electrode constructions known heretofore.

It is also an object of the present invention to provide an electrode construction in which the temperature gradient of the electrode tip is kept sufficiently small to avoid cracking.

It is another object of the present invention to provide an arc electrode construction which is economical and which permits an arc lamp, fitted with such electrodes, to be operated at greater output power than has been possible heretofore.

It is a further object of the present invention to provide a two-piece or more piece arc electrode construction in which the heat is more efficiently and rapidly transferred from the tip to the tip holder than with conventional electrode constructions.

It is still another object of the present invention to provide an improved fluid coolable arc electrode construction of the two-piece or more piece type which is more efficient than prior art electrode constructions, and which therefore allow the arc lamp to be operated at a higher power than lamps constructed with prior art electrodes.

SUMMARY OF THE INVENTION

In accordance with the preferred embodiment of the present invention, the tungsten tip, having a diameter less than the diameter of the tip holder, is welded to the arc facing end face of the tip holder by a peripheral edge weld. Further, a heat dissipation means in the form of an annular sleeve has one end portion peripherally welded to the hot part of the tip, and the other end portion to the tip holder to provide for an added heat conduction to facilitate the transfer of heat from the tip to the fluid cooled tip holder.

BRIEF DESCRIPTION OF THE DRAWINGS

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

DESCRIPTION OF THE PREFERRED EMBODIMENT

Figure 1:
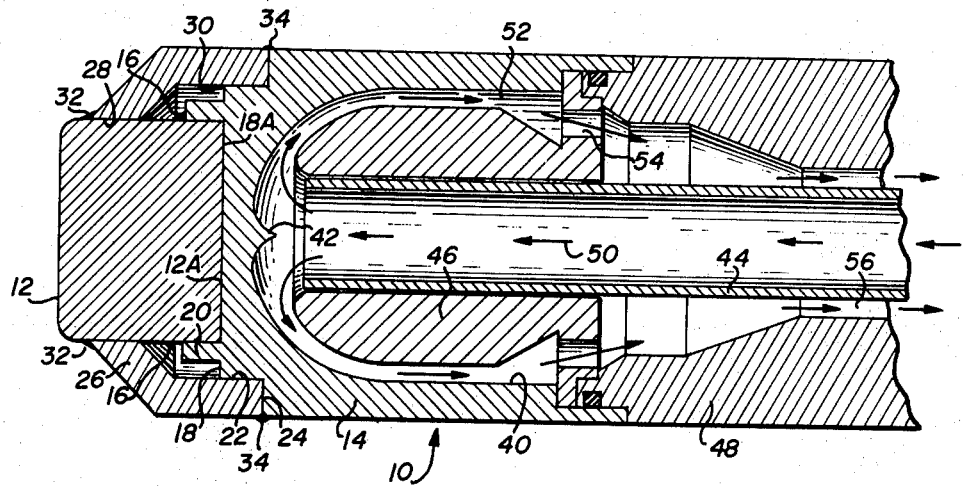
FIG. 1 is a cross-sectional view of the arc electrode construction of the invention.

Referring now to the drawing, there is shown a two-piece, fluid cooled, anode construction 10 in which a button-shaped tungsten tip 12 is affixed to an elongated molybdenum tip holder 14 by means of a peripheral weld 16. Tip holder 14 is generally cylinderical in shape and has an end face 18 which faces in the direction of the arc, which is also referred to as the arc facing end face. End face 18 includes an outwardly projecting annular sleeve 20 whose inner diameter is dimensioned to accommodate tip 12, and whose inner edge is welded to tip 12 to form peripheral weld 16. End face 18 further includes an outer recessed portion which forms a cylindrical boss 22 and a planar annular end face portion 24.

There is further provided a heat conduction means in the form of a molybdenum annular sleeve 26 which has an internal bore 28 on one end portion dimensioned to fit the body of tip 12 and an internal bore 30 in the other end portion to fit around cylindrical boss 22, and to bear against end face portion 24. A peripheral weld 32 connects annular sleeve 26 to tip 12, and a peripheral weld 34 connects annular sleeve 26 to tip holder 14.

Tip holder 14 is hollowed out to define an interior space 40 which is provided with a coolant fluid distribution tit 42 which is concentric with the center line of anode 10. Supported within interior space 40 is a coolant supply tube 44, held in place by a channel form 46 which engages tip holder 14. Connected to tip holder 14 and forming a cylindrical extension thereof is an anode support 48 which forms a seal with a lamp envelope (not shown). A coolant 50 is injected into supply tube 44 under pressure and dumps the coolant into a return channel 52 which is connected through opening 54 in form 46 to a coolant return path 56.

It should be noted from FIG. 1 that tip 12 is the only part of anode 10 constructed of tungsten and has a diameter which is less than the diameter of tip holder 14. This is desirable since it allows accommodation of a heat conduction path in the form of sleeve 26 without increasing the diameter of the anode construction at any point along its length. Of course, it will readily be understood that a tip 12 may be provided which has the same or a substantially similar diameter as the tip holder, and that at least one additional heat conduction path can be provided by an enlarged annular sleeve which would connect the exterior cylindrical surface of tip 12 to the exterior cylindrical surface of tip holder 14.

Figure 2:
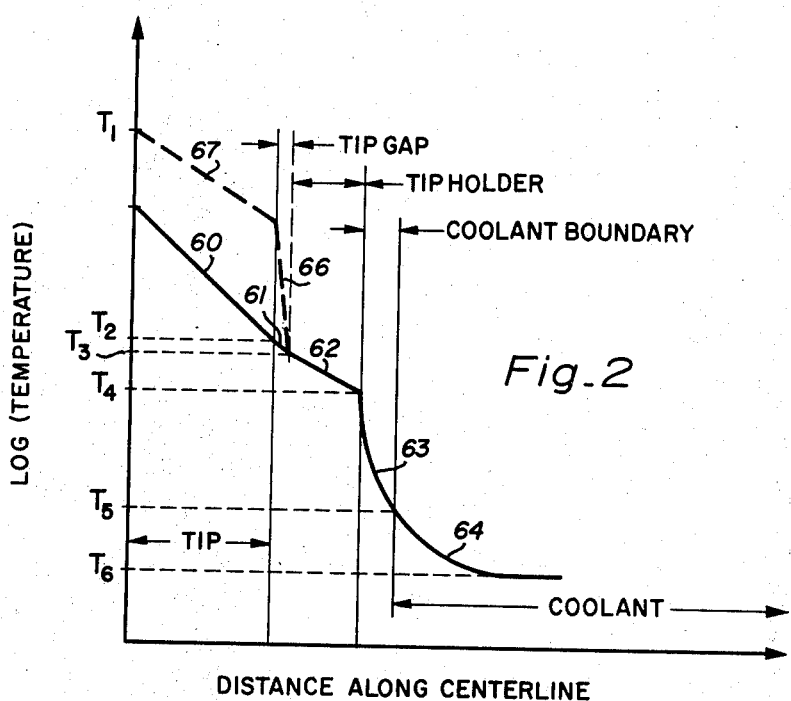
FIG. 2 is a graph showing the relationship between the logarithm of the temperature and the axial distance along the anode from the arc end.

Referring now to FIG. 2, there is shown a curve which depicts the anode temperature, to a logarithmic scale, as a function of the distance from the arc end of tip 12 taken along the center line of anode construction 10. Curve portion 60 shows the temperature distribution from the arc end of the tip, along the center line, to the interface between the tip and the tip holder. The temperature decrease along the tip is gradual, the decrease being from a temperature $T_1$ to a temperature $T_2$.

Curve portion 61 shows the impendance of the interface formed between surfaces 12A and 18A. Across this interface, the temperature gradient is rather steep and decreases rapidly from $T_2$ to $T_3$. It is this temperature impedance with which this invention is particularly concerned. Even though the two surfaces forming the interface are abutting one another, heat flow thereacross is severely restricted which is the reason why one-piece anode constructions are very much more efficient, but are precluded due to material considerations. The reason for the thermal impendance is, of course, due to the fact that the transfer of heat is limited to peripheral weld 16 which may be likened to what happens when two large pipes are connected through a small pipe. This thermal impendance is reduced by annular ring 26 which provides another path for transferring heat from the hot end of the tip to the tip holder, namely, across weld 32 and along ring 26 and across weld 34. The greater the number of additional heat paths, the shallower will be the temperature gradient and the more efficient the anode.

Curve portion 62 shows the distribution of heat along the center line of tip holder 14, the far edge being the end point of tit 42. Curve portion 63 indicates the presence of a somewhat stagnant coolant layer immediately adjacent tip holder 14 which likewise forms a large thermal impedance as evidenced by the steep gradient between $T_4$ and $T_5$. Finally, curve portion 64 shows the temperature distribution of the coolant which ranges from an initial coolant temperature $T_6$ to the temperature $T_5$ formed adjacent to the stagnant layer.

For all practical purposes temperature $T_3$ is, at least to a first approximation, a function of the construction of tip holder 14, the cooling system therein, and the pressure and initial temperature of the coolant. Accordingly, without heat transfer means 26, the temperature of end face 18A will probably be close to $T_3$, but, since the entire heat transfer would be limited to the path formed by weld 16, the thermal impedance would be vastly increased, as illustrated by curve portion 66, and the temperature of the tip would be very much higher as illustrated by curve portion 67. Accordingly, the smaller the thermal impedance between the tip and the cooled tip holder, the lower the tip temperature and the higher the output power from the arc lamp. The temperature gradient along the tip becomes slightly steeper as the thermal impedance between it and the tip holder is reduced, but since the tip is not required to maintain vacuum integrity, this does not detrimentally affect the system. What is important is that the tip temperature has been internally reduced allowing the lamp to be run at increased power. More particularly, the power output of the lamp may be increased to the point at which the tip portion has a temperature which corresponds to the temperature of curve 67.

As far as heat conduction means 26 is concerned, the same has been illustrated as an annular sleeve by way of example only. It will be readily understood that, instead of a single annular sleeve, a plurality of coxial sleeves may be provided to create multiple parallel heat conduction paths, and thereby further reduce the thermal impedance between tip and tip holder. The larger the number of annular sleeves, the better the heat transfer across the interface and the less steep will be the temperature drop thereacross. Additionally, instead of utilizing one or more annular sleeves, it will also be readily understood that individual straps, columns or wires, placed side by side, may likewise be utilized.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. An arc lamp anode structure comprising:
   an electrode tip holder having an arc facing end face;
   an electrode tip connected to said electrode tip holder by a peripheral weld; and
   heat dissipation means weldedly connected, at opposite ends, to said electrode tip and said electrode tip holder respectively said heat dissipation means being formed of a refractory metal.

2. An arc lamp anode structure in accordance with claim 1 in which said electrode tip is constructed of tungsten and said tip holder and heat dissipation means are constructed of a different refractory metal.

3. An arc lamp anode structure in accordance with claim 1 in which said electrode tip has a substantially cylindrical form.

4. An arc lamp anode structure in accordance with claim 1 in which said electrode tip is connected to the arc end facing face of said electrode tip holder.

5. An arc lamp anode structure in accordance with claim 3 in which said electrode tip holder has a substantially cylindrical form whose diameter is greater than the diameter of said electrode tip.

6. An arc lamp anode structure in accordance with claim 5 in which said heat dissipation means is an annular sleeve connected to said arc facing end face of said electrode tip holder by peripheral welds.

7. An arc lamp anode structure in accordance with claim 1 in which said electrode tip is substantially cylindrical in form and the arc opposing end face is substantially planar.

8. An arc lamp anode structure in accordance with claim 7 in which said electrode tip holder includes a cylindrical recess in its arc facing end face for accommodating said electrode tip.

9. An arc lamp anode structure in accordance with claim 1 in which said heat dissipation means is annular.

10. An arc lamp anode structure in accordance with claim 6 in which said heat dissipation means is an annular sleeve having a narrow and a wide inner bore at opposite ends respectively, the narrow bore being weldedly connected to said electrode tip and the wide bore being weldedly connected to said electrode tip holder.

11. An arc lamp anode structure in accordance with claim 1 in which said electrode tip holder has an internal space for receiving a coolant.

References Cited
UNITED STATES PATENTS 3,390,292   6/1968   Perugini _____ 313—23
3,408,518   10/1968   Strupczewski _____ 313—32

JAMES W. LAWRENCE, Primary Examiner

E. R. LA ROCHE, Assistant Examiner

U.S. Cl. X.R.

313—46, 217